(12) United States Patent
Tokitsu et al.

(10) Patent No.: US 11,361,913 B2
(45) Date of Patent: Jun. 14, 2022

(54) POWER ACCUMULATION SYSTEM AND VEHICLE INCLUDING THE SAME

(71) Applicant: Toyota Jidosha Kabushiki Kaisha, Toyota (JP)

(72) Inventors: Ryutaro Tokitsu, Toyota (JP); Kenji Etou, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/104,215

(22) Filed: Nov. 25, 2020

(65) Prior Publication Data

US 2021/0170880 A1  Jun. 10, 2021

(30) Foreign Application Priority Data

Dec. 10, 2019  (JP) .............................. JP2019-223028

(51) Int. Cl.
| | |
|---|---|
| *H01H 1/60* | (2006.01) |
| *H01M 10/42* | (2006.01) |
| *H01H 47/00* | (2006.01) |
| *B60L 3/00* | (2019.01) |

(52) U.S. Cl.
CPC ........... *H01H 1/605* (2013.01); *B60L 3/0023* (2013.01); *H01H 47/002* (2013.01); *H01M 10/4264* (2013.01); *H01M 2220/20* (2013.01)

(58) Field of Classification Search
CPC .... H01H 1/605; H01H 47/002; H01H 47/001; B60L 3/0023; B60L 3/04; B60L 3/0046; B60L 53/18; B60L 53/20; H01M 10/4264; H01M 2220/20; H01M 10/052; H01M 10/42; Y02E 60/10; Y02T 10/70; Y02T 10/7072; Y02T 90/14; Y02T 10/62; H02J 7/0029; H02J 2207/20; B60Y 2200/91; B60Y 2200/92; Y04S 10/126

See application file for complete search history.

(56) References Cited

U.S. PATENT DOCUMENTS

| | | | | |
|---|---|---|---|---|
| 4,283,748 A | * | 8/1981 | Gotoh | .................... H01H 47/00 361/154 |
| 2012/0234060 A1 | | 9/2012 | Kato | |
| 2014/0111120 A1 | | 4/2014 | Mitsutani | |
| 2020/0317076 A1 | * | 10/2020 | Wang | .................... B60L 3/0023 |

FOREIGN PATENT DOCUMENTS

| | | |
|---|---|---|
| EP | 3564981 A1 | 11/2019 |
| JP | 2003-243049 A | 8/2003 |
| JP | 2014-087094 A | 5/2014 |
| JP | 5600623 B2 | 10/2014 |

* cited by examiner

*Primary Examiner* — Daniel Cavallari
(74) *Attorney, Agent, or Firm* — Dinsmore & Shohl LLP

(57) ABSTRACT

A power accumulation system includes a power accumulation device, a relay device provided in a pair of power lines disposed between the power accumulation device and a power conversion device that exchanges power with the power accumulation device, a capacitor provided between the pair of power lines between the relay device and the power conversion device and an electronic control device that controls the relay device. The electronic control device is configured to execute a predetermined foreign matter removal process when it is not possible to bring one of a first relay and a second relay from a power blocking state to a conductive state.

5 Claims, 12 Drawing Sheets

POWER ACCUMULATION SYSTEM AND VEHICLE INCLUDING THE SAME

CROSS-REFERENCE TO RELATED APPLICATION

This application claims priority to Japanese Patent Application No. 2019-223028 filed on Dec. 10, 2019, incorporated herein by reference in its entirety.

BACKGROUND

1. Technical Field

The present disclosure relates to a power accumulation system and a vehicle including the same.

2. Description of Related Art

Japanese Unexamined Patent Application Publication No. 2003-243049 (JP 2003-243049 A) discloses a battery module (power accumulation device) to be mounted on a vehicle. The battery module is provided with a relay that can block power (see JP 2003-243049 A).

SUMMARY

A high-capacity power accumulation system to be mounted on a vehicle etc. includes a relay (system main relay: SMR) provided in a pair of power lines disposed between a power accumulation device and a load drive device (power conversion device). In general, the SMR is provided with a precharge circuit for reducing an in-rush current generated when the SMR is brought from a power blocking state (off state) to a conductive state (on state).

If the SMR is constituted of a contact relay, foreign matter occasionally enters the relay during manufacture. The foreign matter which has entered occasionally moves and adheres to the surface of a contact point along with the use of the SMR, which may prevent the SMR from being brought into the conductive state.

The present disclosure provides a power accumulation system that can suppress the occurrence of a situation in which the SMR cannot be brought into the conductive state because of foreign matter that has entered the SMR, and a vehicle including the same.

A first aspect of the present disclosure provides a power accumulation system including: a power accumulation device; a relay device provided in a pair of power lines disposed between the power accumulation device and a power conversion device that exchanges power with the power accumulation device; a capacitor provided between the pair of power lines between the relay device and the power conversion device; and an electronic control device that controls the relay device. The relay device includes a first relay provided in one of the pair of power lines, a second relay provided in the other of the pair of power lines, and a precharge circuit connected in parallel with the second relay. The precharge circuit includes a third relay and a limiting resistor connected in series with the third relay. Each of the first relay and the second relay is a contact relay. The electronic control device is configured to execute a predetermined foreign matter removal process when it is not possible to bring one of the first relay and the second relay from a power blocking state to a conductive state. The foreign matter removal process includes a process of bringing a relay that is not the one of the relays that is not possible to be brought into the conductive state into the conductive state in a state in which the first to third relays are in the power blocking state, and then outputting a conduction command to the relay that is not possible to be brought into the conductive state.

The power accumulation system described above includes a precharge circuit. When the connection between the power accumulation device and the power conversion device is brought into the conductive state, normally, both the first and second relays are brought into the conductive state after reducing the voltage difference between the power accumulation device and the capacitor by charging the capacitor while suppressing the current using the precharge circuit, in order to reduce an in-rush current from the power accumulation device to the capacitor.

In the power accumulation system, the foreign matter removal process is executed if one of the first and second relays cannot be brought into the conductive state. In the foreign matter removal process, a relay that is not the one of the relays that cannot be brought into the conductive state is brought into the conductive state, and thereafter a conduction command is output to the relay that cannot be brought into the conductive state. Consequently, a conduction command is output to the relay that cannot be brought into the conductive state when the voltage difference between the power accumulation device and the capacitor is large, which may make it possible to remove foreign matter using the energy of an arc generated at a contact point of the relay.

The cause of a relay being unable to be brought into the conductive state may not necessarily be foreign matter. If such a cause is foreign matter, however, the foreign matter may be removed. Thus, with the configuration described above, it is possible to suppress the occurrence of a situation in which the first or second relay cannot be brought into the conductive state because of foreign matter that has entered.

In the aspect described above, the electronic control device may be configured to execute a precharge process when the power accumulation system is started, the precharge process including a process of bringing the third relay into the conductive state after the first relay is brought into the conductive state and before the second relay is brought into the conductive state; and the electronic control device may be configured to execute the foreign matter removal process without executing the precharge process when it is not possible to bring one of the first relay and the second relay from the power blocking state to the conductive state.

With the configuration described above, a conduction command is output to the relay that cannot be brought into the conductive state when the voltage difference between the power accumulation device and the capacitor is large, which may make it possible to remove foreign matter using the energy of an arc generated at a contact point of the relay. Thus, with the configuration described above, it is possible to suppress the occurrence of a situation in which the first or second relay cannot be brought into the conductive state because of foreign matter that has entered.

In the aspect described above, the electronic control device may be configured to execute a precharge process when the power accumulation system is started, the precharge process including a process of bringing the third relay into the conductive state after the first relay is brought into the conductive state and before the second relay is brought into the conductive state; the electronic control device may be configured to output a conduction command to the second relay after a predetermined time elapses since the third relay is brought into the conductive state after the first relay is brought into the conductive state in the foreign matter removal process when it is not possible to bring the second relay from the power blocking state to the conductive state; and the predetermined time may be shorter than a precharge time since the third relay is brought into the conductive state until the second relay is brought into the conductive state in the precharge process.

With the configuration described above, the magnitude of the voltage difference between the power accumulation device and the capacitor at the time when a conduction command is output to the second relay in the foreign matter removal process can be adjusted by adjusting the predetermined time. Thus, foreign matter can be removed while giving consideration to damage that may be received by the second relay in the foreign matter removal process.

In the aspect described above, the electronic control device may be configured to execute a precharge process when the power accumulation system is started, the precharge process including a process of bringing the third relay into the conductive state after the first relay is brought into the conductive state and before the second relay is brought into the conductive state; the electronic control device may be configured to output a conduction command to the second relay after the third relay is brought into the conductive state after the first relay is brought into the conductive state in the foreign matter removal process when it is not possible to bring the second relay from the power blocking state to the conductive state; and a voltage difference between a voltage of the power accumulation device and a voltage of the capacitor at a time when the conduction command is output to the second relay in the foreign matter removal process may be larger than the voltage difference at a time when the second relay is brought into the conductive state in the precharge process.

With the configuration described above, the voltage difference between the power accumulation device and the capacitor at the time when the conduction command is output to the second relay in the foreign matter removal process is larger than the voltage difference at the time when the second relay is brought into the conductive state in the precharge process. Consequently, foreign matter can be removed while giving consideration to damage that may be received by the second relay in the foreign matter removal process.

In addition, a second aspect of the present disclosure provides a vehicle including: the power accumulation system; a power conversion device that exchanges power with the power accumulation system; and an electric motor for travel that receives power from the power conversion device to generate a drive force.

With the configuration described above, it is possible to suppress the occurrence of a situation in which the first or second relay cannot be brought into the conductive state because of foreign matter that has entered the relay of the power accumulation system. Thus, it is possible to suppress the occurrence of a situation in which the vehicle cannot travel because the relay device is not brought into the conductive state and power cannot be supplied from the power accumulation device to the power conversion device.

With the power accumulation system according to the present disclosure, it is possible to suppress the occurrence of a situation in which the relay device cannot be brought into the conductive state because of foreign matter that has entered the relay of the relay device. With the vehicle according to the present disclosure, in addition, it is possible to suppress the occurrence of a situation in which the vehicle cannot travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 illustrates a state (conductive state) in which the relay is turned on;

FIG. 9 is a timing chart illustrating operation of the relays at the time when a first abnormality flag turned is on;

FIG. 10 is a timing chart illustrating operation of the relays at the time when a second abnormality flag turned is on;

DETAILED DESCRIPTION OF EMBODIMENTS

Figure 1:
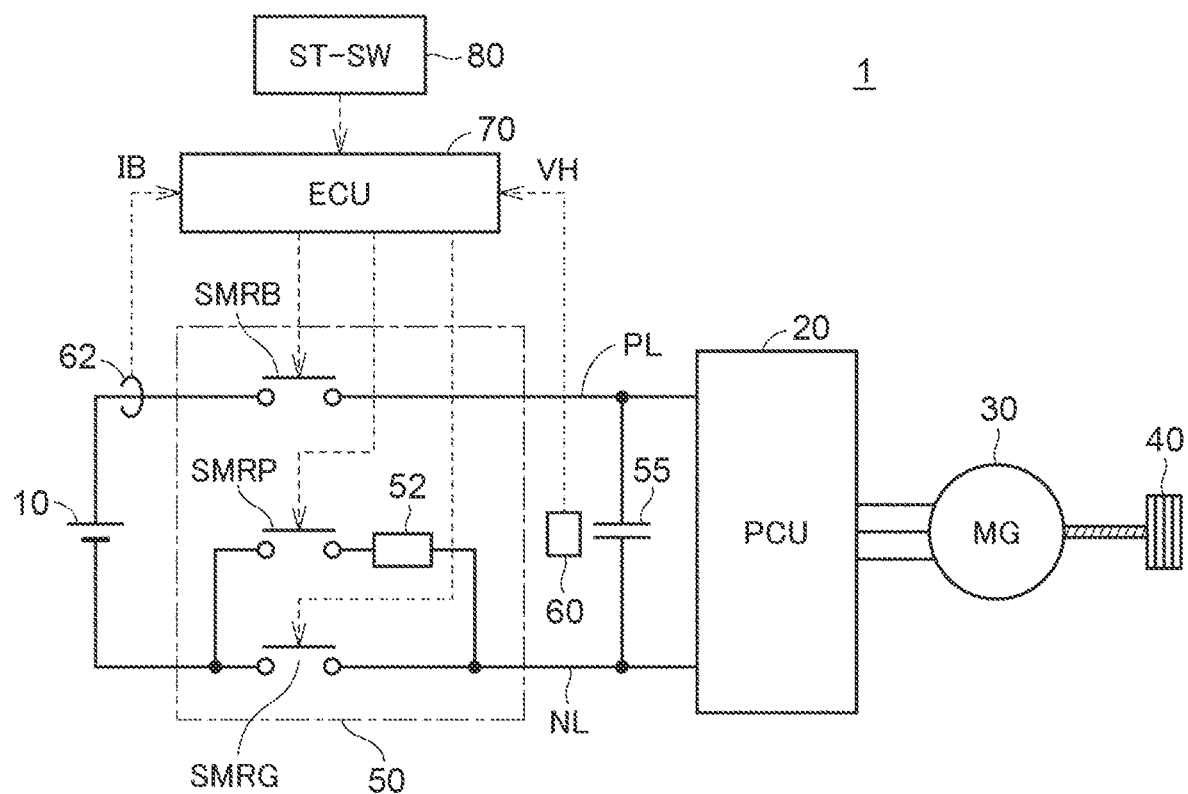
FIG. 1 schematically illustrates the configuration of a vehicle with a power accumulation system according to a first embodiment of the present disclosure.

Embodiments of the present disclosure will be described in detail below with reference to the drawings. Like and equivalent portions are given like signs in the drawings to omit repeated description.

First Embodiment

FIG. 1 schematically illustrates the configuration of a vehicle with a power accumulation system according to a first embodiment of the present disclosure. In the following, the vehicle is an electric vehicle (EV) as a typical example. However, the power accumulation system according to the present disclosure is not limited to being mounted on an EV, and may be mounted on a hybrid vehicle (HV), a plug-in HV, etc., and is further applicable to uses other than vehicles.

With reference to FIG. 1, a vehicle 1 includes a power accumulation device 10, a power control unit (hereinafter referred to as a "PCU") 20, a motor generator (hereinafter referred to as an "MG") 30, a drive wheel 40, and a system main relay (SMR) 50. The vehicle 1 further includes a smoothing capacitor 55, a voltage sensor 60, a current sensor 62, an electronic control device (hereinafter referred to as an "electronic control unit (ECU)") 70, and a start switch (ST-SW) 80.

The power accumulation device 10 is a power storage element configured to be rechargeable. The power accumulation device 10 is configured to include a secondary battery such as a lithium-ion battery or a nickel-metal hydride battery or a power accumulation element such as an electric double layer capacitor, for example. The lithium-ion secondary battery is a secondary battery that includes lithium as a charge carrier, and may include common lithium-ion secondary batteries with a liquid electrolyte and so-called solid-state batteries with a solid electrolyte.

The power accumulation device 10 accumulates power for driving the MG 30, and can supply power to the MG 30 through the PCU 20. Meanwhile, the power accumulation device 10 is charged with generated power through the PCU 20 when the MG 30 generates power.

The PCU 20 executes bidirectional power conversion between the power accumulation device 10 and the MG 30 in accordance with a control signal from the ECU 70. The PCU 20 is configured to include an inverter that drives the MG 30, and a converter that boosts a direct-current (DC) voltage supplied to the inverter to a voltage that is equal to or more than the output voltage of the power accumulation device 10.

The MG 30 is typically an alternating-current (AC) rotary electric machine. Examples of the MG 30 include a three-phase AC synchronous motor in which permanent magnets are embedded in a rotor. The MG 30 is driven by the PCU 20 to generate a rotational drive force. The drive force generated by the MG 30 is transferred to the drive wheel 40. When the vehicle 1 is braked or when the acceleration of the vehicle 1 is reduced on a downward slope, on the other hand, the MG 30 operates as an electric generator to perform regenerative power generation. The power generated by the MG 30 is supplied to the power accumulation device 10 through the PCU 20.

The smoothing capacitor 55 is electrically connected between a positive pole line PL and a negative pole line NL, and smoothes AC components of voltage fluctuations between the positive pole line PL and the negative pole line NL. The smoothing capacitor 55 may be included in the PCU 20.

The SMR 50 includes relays SMRB, SMRG, and SMRP and a limiting resistor 52. The relay SMRB is provided in the positive pole line PL which connects between the positive pole of the power accumulation device 10 and the PCU 20. The relay SMRG is provided in the negative pole line NL which connects between the negative pole of the power accumulation device 10 and the PCU 20. The relay SMRP and the limiting resistor 52 are connected in series with each other, and connected in parallel with the relay SMRG.

In the present first embodiment, each of the relays is constituted as a contact relay (mechanical relay). The relay SMRP may be a non-contact relay (semiconductor relay). Each of the relays is turned on and off in response to a control signal from the ECU 70.

The relay SMRP and the limiting resistor 52 form a precharge circuit that reduces an in-rush current that flows when the SMR 50 is turned on. That is, when the SMR 50 is to be turned on, the relay SMRP is turned on after the relay SMRB is turned on and before the relay SMRG is turned on, and the smoothing capacitor 55 is charged in advance while the limiting resistor 52 is limiting the current. This reduces the in-rush current which flows from the power accumulation device 10 to the smoothing capacitor 55 when the SMR 50 is turned on.

The voltage sensor 60 detects a voltage between the terminals of the smoothing capacitor 55, that is, a voltage VH between the positive pole line PL and the negative pole line NL, and outputs a detected value to the ECU 70. The current sensor 62 detects a current IB input to and output from the power accumulation device 10, and outputs a detected value to the ECU 70. The current sensor 62 detects a discharge current as a positive value, and detects a charge current as a negative value, for example.

The start switch 80 is operable by a driver of the vehicle 1. The system of the vehicle 1 is started (Ready-ON) by the driver performing an on operation on (e.g. depressing in the Ready-OFF state) the start switch 80. Meanwhile, the system of the vehicle 1 is stopped (Ready-OFF) by the driver performing an off operation on (e.g. depressing in the Ready-ON state) the start switch 80.

The ECU 70 is configured to include a central processing unit (CPU), memories (a read only memory (ROM) and a random access memory (RAM)), and input and output ports for input and output of various signals (any of which is not illustrated). The CPU develops a program stored in the ROM in the RAM etc., and executes the program. The program stored in the ROM includes processes to be executed by the CPU. The ECU 70 controls various devices in the vehicle 1 by executing the processes included in the program. A part or all of the control is not limited to being processed using software, and may be processed using dedicated hardware (electronic circuit).

In an example of the main processes executed by the ECU 70, when an on operation is performed on the start switch 80, the ECU 70 executes a process (starting process) for bringing the vehicle 1 into the Ready-ON state, and turns on the SMR 50 in the process. When an off operation is performed on the start switch 80, meanwhile, the ECU 70 executes a process (stopping process) for bringing the vehicle 1 into the Ready-OFF state, and turns off the SMR 50 in the process.

Further, the ECU 70 executes a relay monitoring process for monitoring an abnormality of the SMR 50. In the first embodiment, the ECU 70 executes the relay monitoring process when the SMR 50 is turned on. If an abnormality in which the SMR 50 is not turned on is detected in the relay monitoring process, the power accumulation system according to the present first embodiment executes a foreign matter removal process for removing foreign matter that has possibly entered a relay in consideration of the possibility that foreign matter has entered the relay SMRB or the relay SMRG and therefore the relay is not brought into the conductive state. The entry of foreign matter and the method of removing the foreign matter will be described in detail below.

Figure 2:
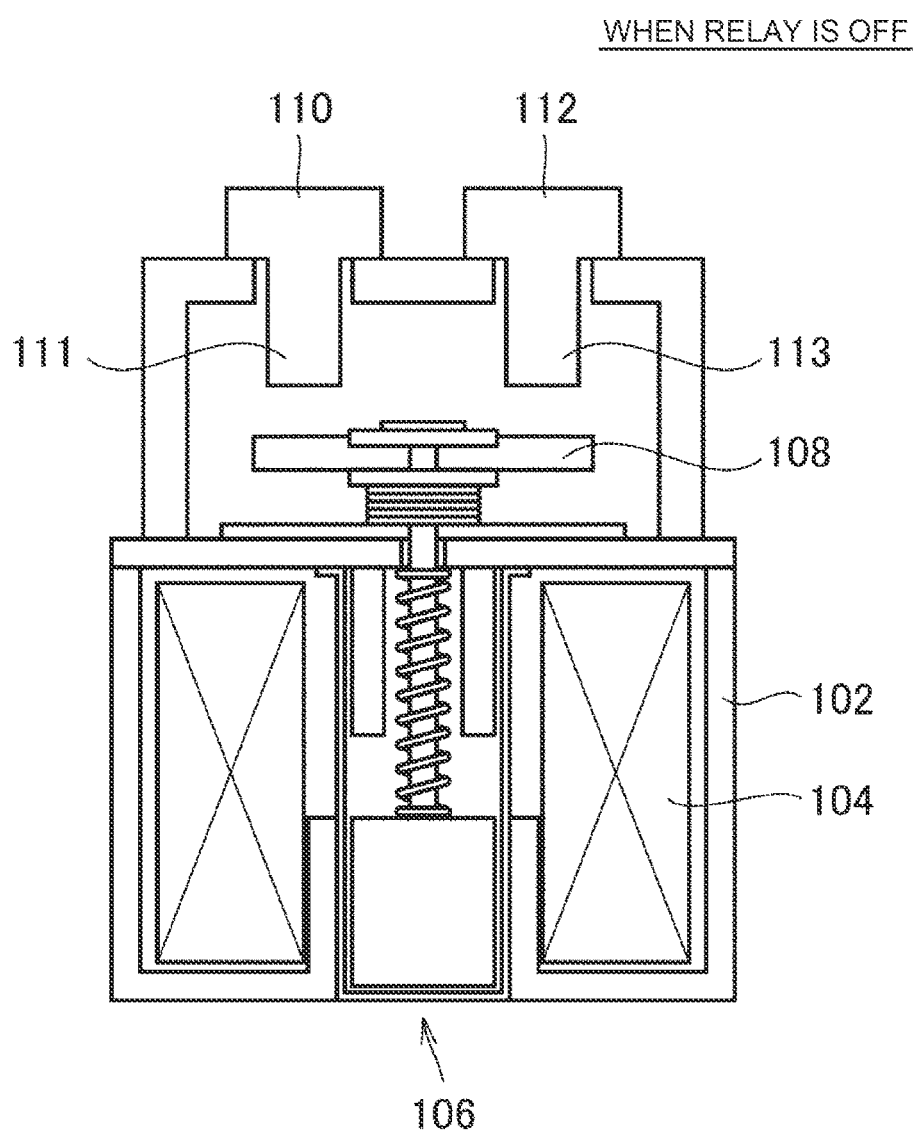
FIG. 2 illustrates an example of the configuration of a contact relay that constitutes an SMR.

FIG. 2 illustrates an example of the configuration of a contact relay that constitutes the SMR 50. In the present first embodiment, the relays SMRB, SMRG, and SMRP have the same configuration. In FIG. 2 and FIGS. 3 to 5 to be described later, the relays are plunger-type contact relays. However, the relays may be hinge-type contact relays. FIG. 2 illustrates a state in which the relay has been turned off (power blocking state).

With reference to FIG. 2, the relay is configured to include a case 102, a coil 104, a plunger portion 106, a movable contact point 108, and terminals 110 and 112. The coil 104 generates an electromagnetic force for moving the plunger portion 106 upward when a current is supplied from the outside.

The plunger portion 106 is configured to be movable upward by the electromagnetic force received from the coil 104, and pushed downward by the biasing force of a spring when the electromagnetic force is not received from the coil 104. The movable contact point 108 is constituted from a conductor, and configured to be movable up and down together with the plunger portion 106.

When a current flows through the coil 104, the plunger portion 106 is moved upward by the electromagnetic force, and the movable contact point 108 contacts fixed contact points 111 and 113 of the terminals 110 and 112, respectively. When no current is flowing through the coil 104, the plunger portion 106 is moved downward by the biasing force of the spring, and the movable contact point 108 is brought out of contact with the fixed contact points 111 and 113.

In FIG. 2, no current is supplied to the coil 104, the plunger portion 106 is pushed downward, and the movable contact point 108 is away from the fixed contact points 111 and 113 of the terminals 110 and 112, respectively (non-conductive state).

Figure 3:
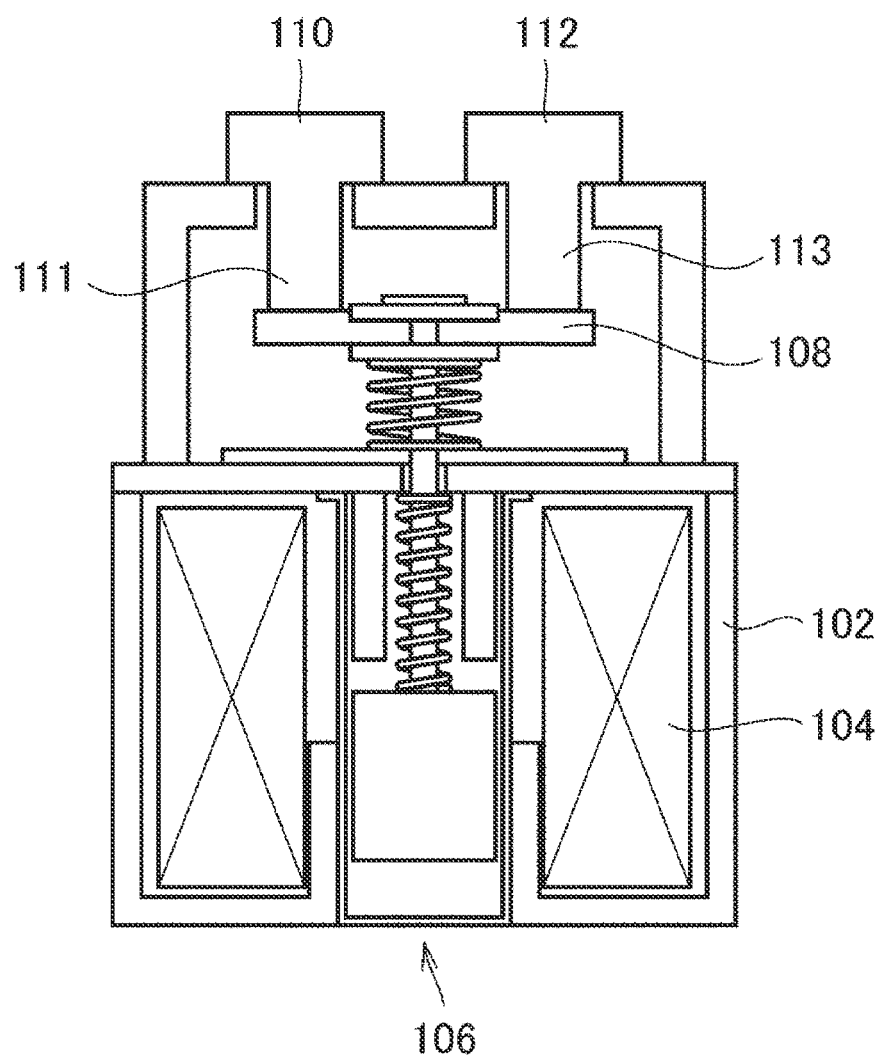

FIG. 3 illustrates a state (conductive state) in which the relay is turned on. With reference to FIG. 3, a current flows through the coil 104, and the plunger portion 106 is moved upward by the electromagnetic force received from the coil 104. This allows the movable contact point 108 to contact the fixed contact points 111 and 113, and the terminals 110 and 112 are continuous through the movable contact point 108 (on state).

Figure 4:
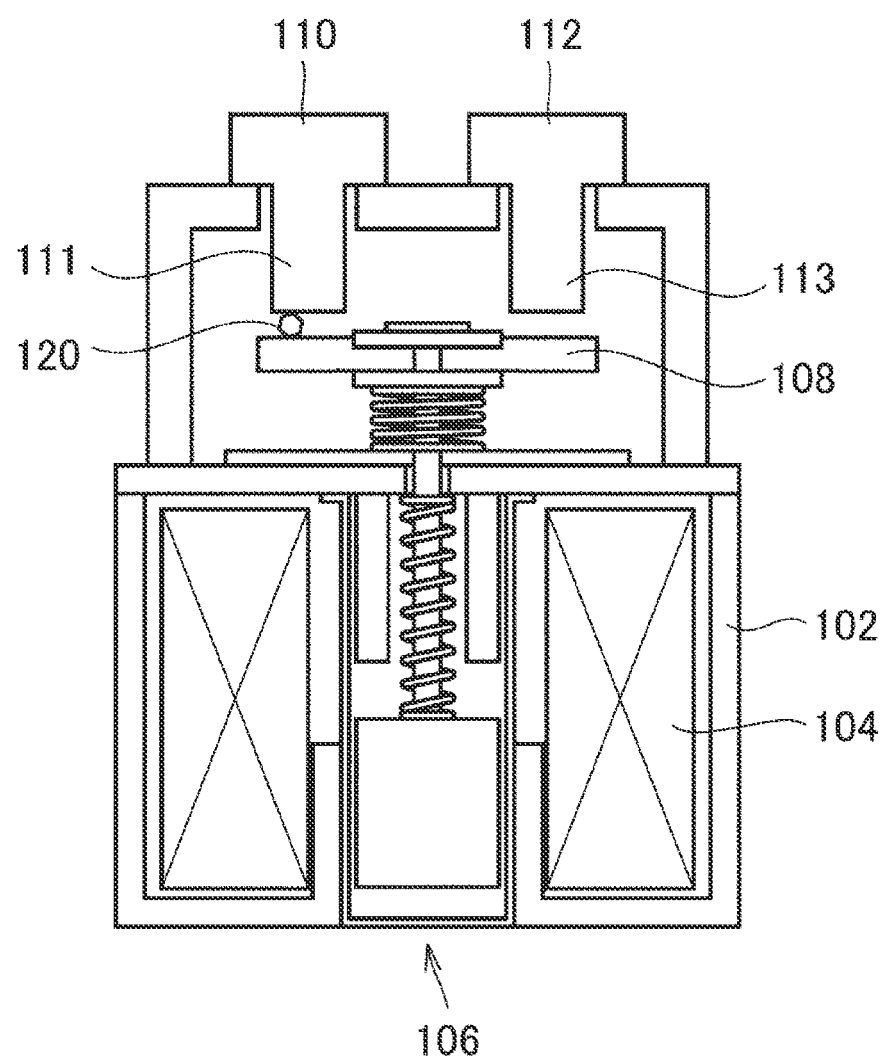
FIG. 4 illustrates a state in which foreign matter adheres to the surface of a contact point of the relay.

FIG. 4 illustrates a state in which foreign matter adheres to the surface of a contact point of the relay. With reference to FIG. 4, a current flows through the coil 104, and the plunger portion 106 is moved upward by the electromagnetic force received from the coil 104. In this example, however, foreign matter 120 has entered a space between the movable contact point 108 and the fixed contact point 111 of the terminal 110, and the movable contact point 108 does not contact the fixed contact points 111 and 113. Therefore, the terminals 110 and 112 are not continuous through the movable contact point 108.

In this manner, foreign matter 120 (e.g. resin foreign matter) occasionally enters a contact relay during manufacture. The foreign matter 120 which has entered occasionally moves and adheres to the surface of a contact point along with the use of the relay, which may prevent the relay from being brought into the conductive state as illustrated in FIG. 4.

Figure 5:
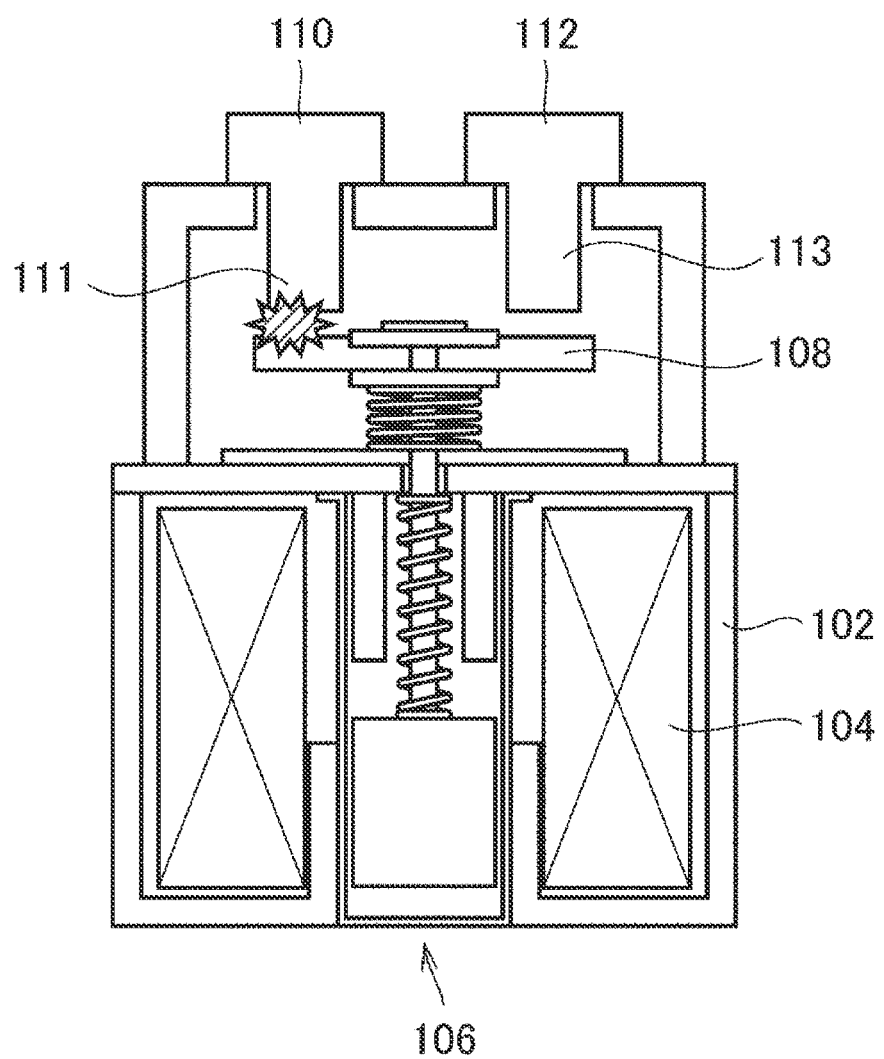
FIG. 5 illustrates how foreign matter that has entered the relay is to be removed.

FIG. 5 illustrates how foreign matter that has entered the relay is to be removed. With reference to FIG. 5, the power accumulation system according to the first embodiment executes a process for removing foreign matter when the relay is not brought into the conductive state (on state) because of entry of foreign matter 120 as illustrated in FIG. 4. Foreign matter 120 can be removed from the relays SMRB and SMRG through the foreign matter removal process. Foreign matter cannot be removed from the relay SMRP through the method described below, and there is no effect on travel if the relay SMRP is not turned on as long as the relays SMRB and SMRG are turned on. Therefore, the relay SMRP is not subjected to the foreign matter removal process according to the present first embodiment.

In the foreign matter removal process according to the present first embodiment, a relay that is not the one of the relays SMRB and SMRG that cannot be brought into the conductive state is turned on, and thereafter an on command is output to the relay that cannot be brought into the conductive state. If it is detected that the relay SMRB is not brought into the conductive state, by way of example, the relay SMRG is turned on, and thereafter an on command is output to the relay SMRB.

If the relays SMRB and SMRG are to be turned on, normally, both the relays SMRB and SMRG are brought into the conductive state after the voltage difference between the power accumulation device 10 and the smoothing capacitor 55 is reduced by a precharge circuit executing a precharge process, in order to reduce an in-rush current. In the foreign matter removal process described above, in contrast, an on command is output to the relay that cannot be brought into the conductive state (the relay SMRB in the example described above) when the voltage difference between the power accumulation device 10 and the smoothing capacitor 55 is large. This may make it possible to remove foreign matter using the energy of an arc generated at a contact point of the relay.

The cause of a relay being unable to be brought into the conductive state may not necessarily be foreign matter 120. If such a cause is foreign matter 120, however, the foreign matter 120 may be removed. Thus, it is possible to suppress the occurrence of a situation in which the relay SMRB or the relay SMRG cannot be brought into the conductive state because of entry of foreign matter 120.

Figure 6:
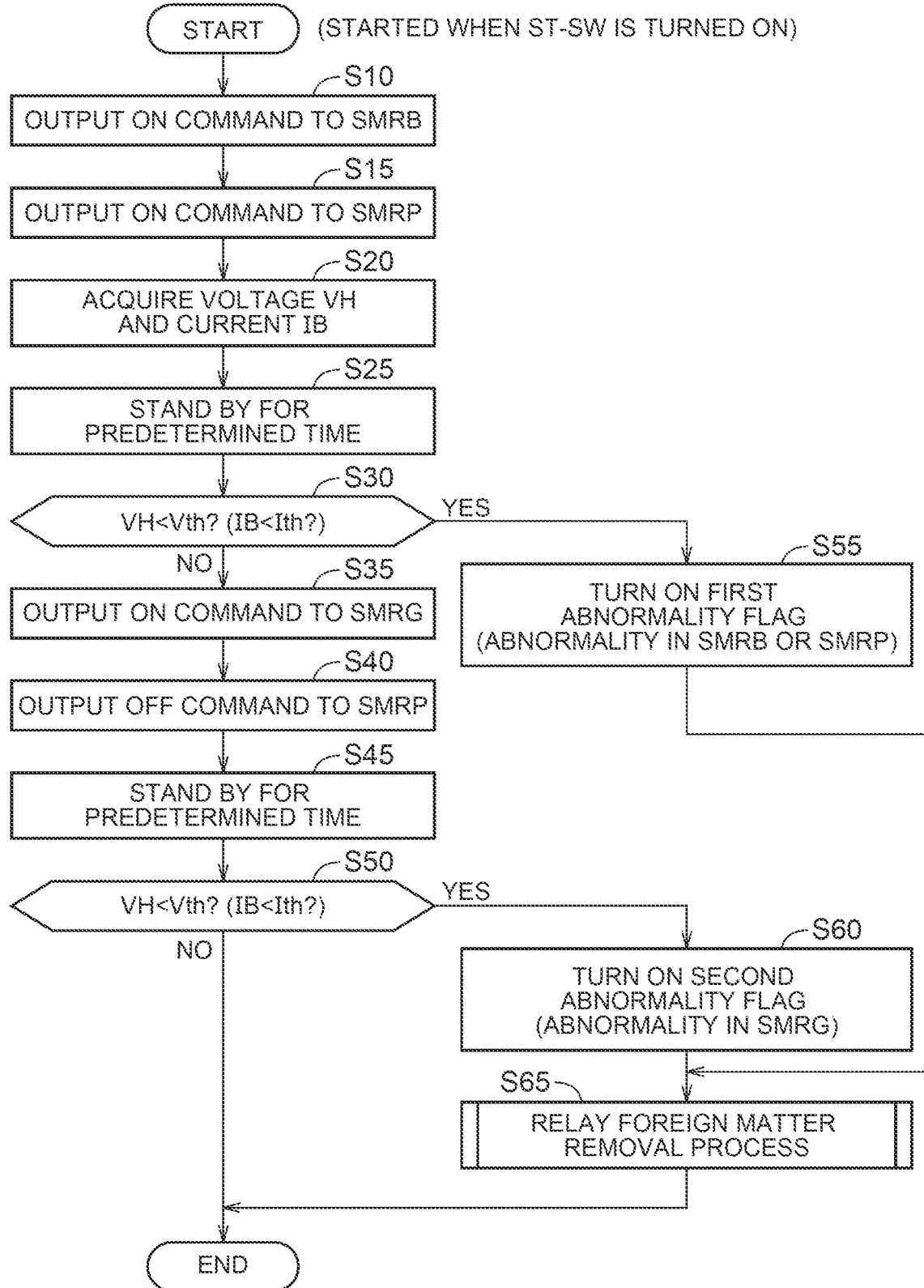
FIG. 6 is a flowchart illustrating an example of the procedure of a relay monitoring process executed by an ECU.

FIG. 6 is a flowchart illustrating an example of the procedure of a relay monitoring process executed by the ECU 70. The foreign matter removal process described above is executed on the basis of the result of the relay monitoring process as to the presence or absence of an abnormality in the relays. The sequence of processes indicated in the flowchart is executed at the timing when an on operation is performed on the start switch 80 (when the vehicle system is started).

With reference to FIG. 1 together with FIG. 6, when an on operation is performed on the start switch 80, the ECU 70 first outputs an on command to the relay SMRB (step S10). Next, the ECU 70 outputs an on command to the relay SMRP (step S15). Consequently, a precharge process in which the smoothing capacitor 55 is charged with a current limited by the limiting resistor 52 is executed.

Next, the ECU 70 acquires a detected value of the voltage VH from the voltage sensor 60, and acquires a detected value of the current IB from the current sensor 62 (step S20). Then, after standing by for a predetermined time (step S25), the ECU 70 determines whether the voltage VH is less than a threshold value Vth (step S30). This process is performed to detect an abnormality in which the contact points of the relay SMRB (or the relay SMRP) are not continuous. The threshold value Vth is set, as appropriate, to a value that is less than the value of the voltage VH to which the voltage VH may be normally raised after the predetermined time elapses since the relay SMRB or SMRP is brought into the conductive state.

Whether the current IB is less than a threshold value Ith may be determined instead of determining whether the voltage VH is less than the threshold value Vth. It is possible to detect an abnormality in which the contact points of the relay SMRB (or the relay SMRP) are not continuous also in accordance with the magnitude of the current IB.

If it is determined in step S30 that the voltage VH is equal to or more than the threshold value Vth (NO in step S30), it is determined that the relays SMRB and SMRP are normal, and the ECU 70 outputs an on command to the relay SMRG (step S35). Next, the ECU 70 outputs an off command to the relay SMRP (step S40).

Then, after standing by for a predetermined time (step S45), the ECU 70 determines again whether the voltage VH is less than the threshold value Vth (step S50). This process is performed to detect an abnormality in which the contact points of the relay SMRG are not continuous. That is, if the contact points of the relay SMRG are not continuous, the circuit of the power accumulation device 10 and the smoothing capacitor 55 is blocked when the relay SMRP is turned off, and the voltage VH of the smoothing capacitor 55 is lowered by a discharge resistor (not illustrated).

Here again, whether the current IB is less than the threshold value Ith may be determined instead of determining whether the voltage VH is less than the threshold value Vth. It is possible to detect an abnormality in which the contact points of the relay SMRG are not continuous also in accordance with the magnitude of the current IB.

If it is determined in step S50 that the voltage VH is equal to or more than the threshold value Vth (NO in step S50), it is determined that the relay SMRG is also normal, and the sequence of processes is finished.

If it is determined in step S30 that the voltage VH is less than the threshold value Vth (YES in step S30), on the other hand, the ECU 70 turns on a first abnormality flag indicating that the relay SMRB or the relay SMRP is abnormal (the contact points of the relay are not continuous even if an on command is output) (step S55). Then, the ECU 70 executes a relay foreign matter removal process for removing foreign matter that has possibly entered the relay SMRB and blocked the continuity between the contact points of the relay SMRB (step S65).

It is also conceivable that the voltage VH is less than the threshold value Vth since the contact points of the relay SMRP are not continuous. Since the possibility of entry of foreign matter into the relay SMRB cannot be excluded, however, the process for removing foreign matter that has possibly entered the relay SMRB is executed when it is determined that the voltage VH is less than the threshold value Vth. The relay foreign matter removal process will be described in detail later.

If it is determined in step S50 that the voltage VH is less than the threshold value Vth (YES in step S50), meanwhile, the ECU 70 turns on a second abnormality flag indicating that the relay SMRG is abnormal (the contact points of the relay are not continuous even if an on command is output) (step S60). Then, the process transitions to step S65, and the ECU 70 executes a relay foreign matter removal process for removing foreign matter that has possibly entered the relay SMRG and blocked the continuity between the contact points of the relay SMRG.

Figure 7:
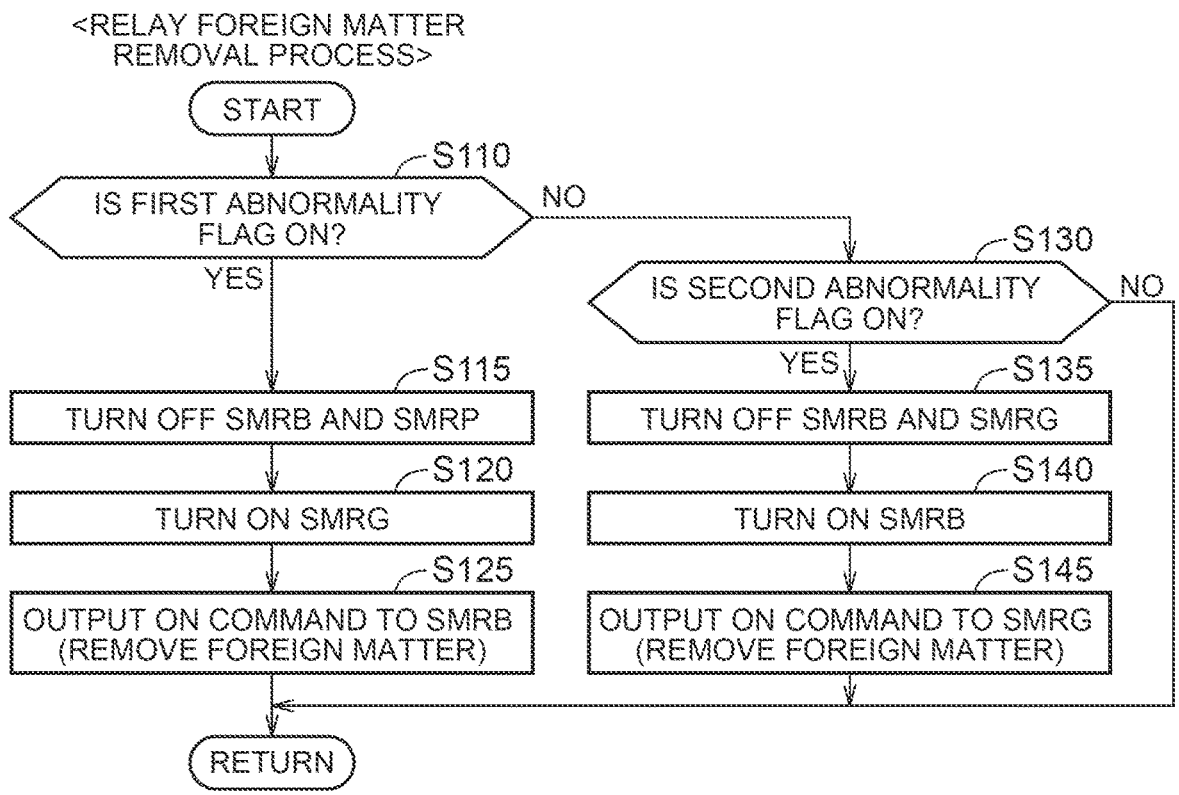
FIG. 7 is a flowchart illustrating an example of the procedure of a relay foreign matter removal process executed in step S65 in FIG. 6.

FIG. 7 is a flowchart illustrating an example of the procedure of a relay foreign matter removal process executed in step S65 in FIG. 6. With reference to FIG. 7, the ECU 70 determines whether the first abnormality flag is on (step S110). If it is determined that the first abnormality flag is off (NO in step S110), the process transitions to step S130 to be discussed later.

If it is determined in step S110 that the first abnormality flag is on (YES in step S110), the ECU 70 turns off the relays SMRB and SMRP which have been on at this time (step S115). Next, the ECU 70 turns on the relay SMRG which is on the opposite side from the relay SMRB which foreign matter has possibly entered (step S120).

Then, after the relay SMRG is turned on, the ECU 70 outputs an on command to the relay SMRB which foreign matter has possibly entered (step S125). That is, to turn on the relays SMRB and SMRG, normally, a precharge process in which the relay SMRP (precharge circuit) is used is executed, as described in relation to FIG. 6. In the foreign matter removal process, however, an on command is output to the relay SMRB which foreign matter has possibly entered after the relay SMRG is turned on without executing the precharge process.

At this time, since the precharge process is not executed before an on command is output to the relay SMRB, an on command is output to the relay SMRB when the voltage difference between the power accumulation device 10 and the smoothing capacitor 55 is large. This may make it possible to remove foreign matter using the energy of an arc generated at a contact point of the relay SMRB if foreign matter adheres to the surface of the contact point of the relay SMRB.

If the result of the determination in step S110 is NO, on the other hand, the ECU 70 determines whether a second abnormality flag is on (step S130). If it is determined that the second abnormality flag is off (NO in step S130), the process transitions to return.

If it is determined in step S130 that the second abnormality flag is on (YES in step S130), the ECU 70 turns off the relays SMRB and SMRG which have been on at this time (step S135). Next, the ECU 70 turns on the relay SMRB which is on the opposite side from the relay SMRG which foreign matter has possibly entered (step S140).

Then, after the relay SMRB is turned on, the ECU 70 outputs an on command to the relay SMRG which foreign matter has possibly entered (step S145). That is, also when the second abnormality flag is on, as when the first abnormality flag is on, an on command is output to the relay SMRG which foreign matter has possibly entered after the relay SMRB is turned on without executing the precharge process. This may make it possible to remove foreign matter using the energy of an arc generated at a contact point of the relay SMRG if foreign matter adheres to the surface of the contact point of the relay SMRG.

Figure 8:
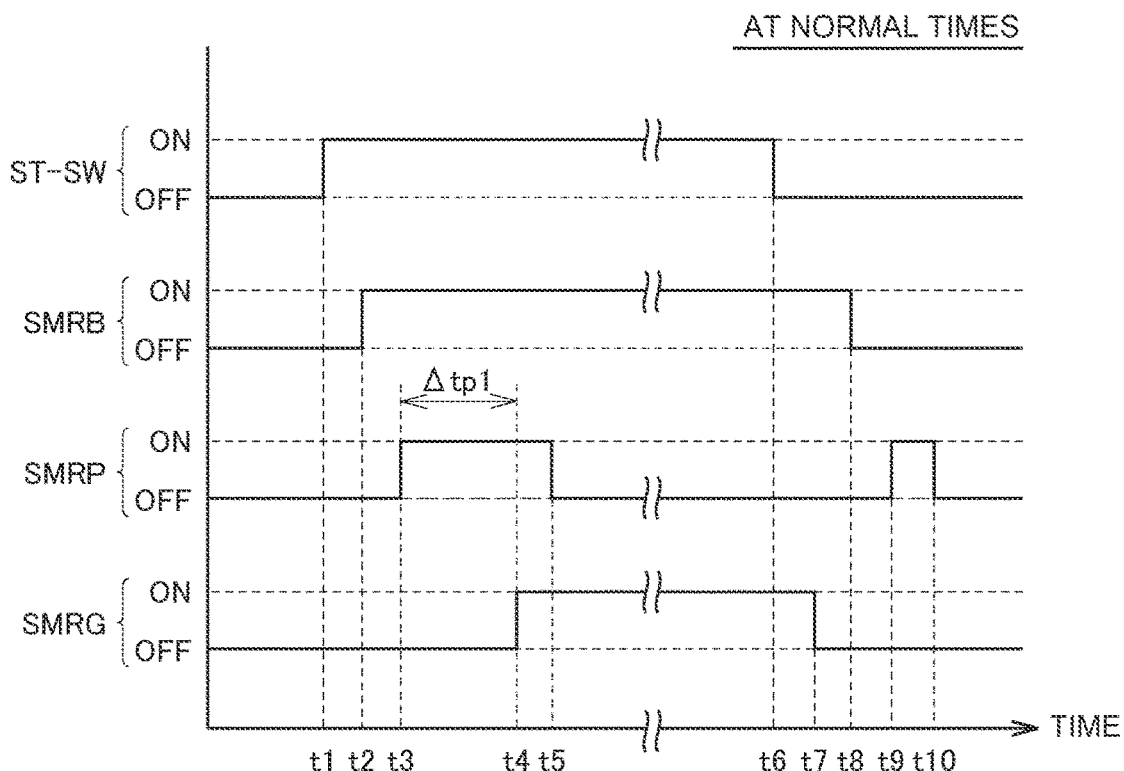
FIG. 8 is a timing chart illustrating operation of relays at the time when the relays are normal.
Figure 9:
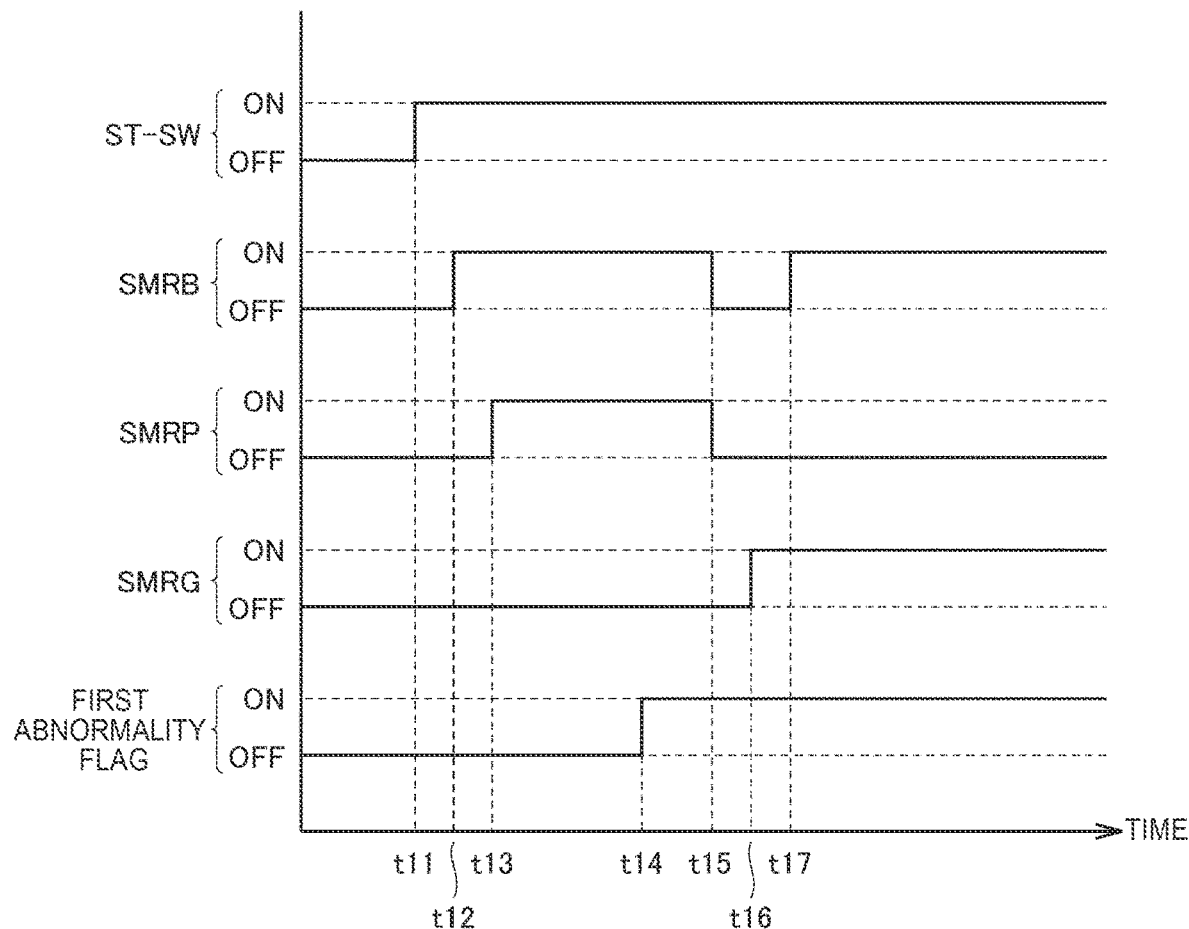
Figure 10:
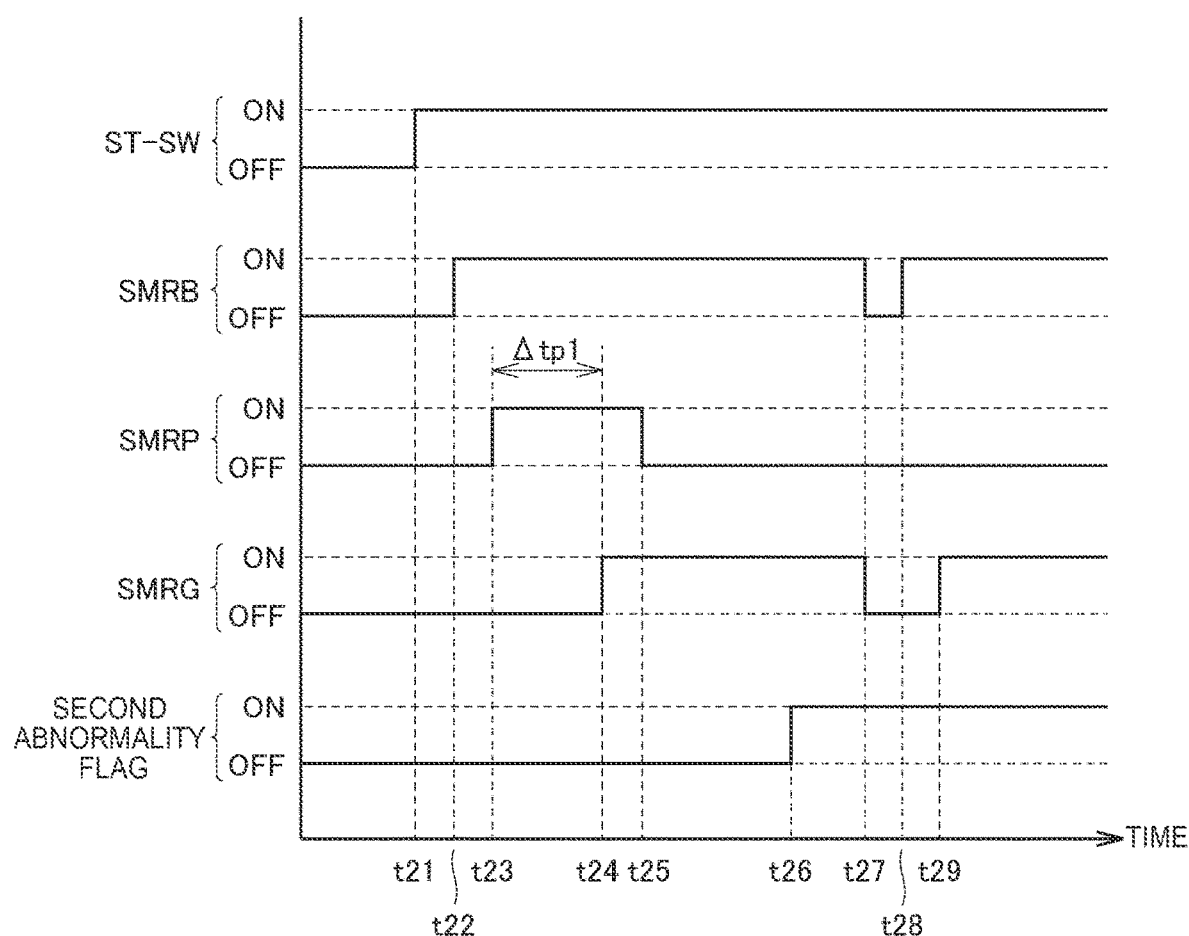

FIGS. 8 to 10 are each a timing chart chronologically illustrating operation of the relays SMRB, SMRP, and SMRG. FIG. 8 is a timing chart illustrating operation of the relays at the time when the relays are normal.

With reference to FIG. 8, when an on operation is performed on the start switch 80 at time t1, the relay SMRB is turned on at time t2, and the relay SMRP is turned on at time t3. A precharge process is executed when the relay SMRP is turned on.

At time t4 at which a predetermined time Δtp1 has elapsed since time t3, the voltage VH is equal to or more than the threshold value Vth (not illustrated), and thus the relay SMRG is turned on. After that, the relay SMRP of the precharge circuit is turned off at time t5. Consequently, the relays SMRB and SMRG are turned on along with the precharge process when the start switch 80 is turned on.

When an off operation is performed on the start switch 80, seizure of the relays is checked. That is, when an off operation is performed on the start switch 80 at time t6, the relay SMRG is turned off at time t7. At this time, it is determined that the relay SMRG has been seized (seized on) if the voltage VH is not lowered.

When the voltage VH is lowered as the relay SMRG is turned off at time t7, the relay SMRB is turned off at time t8. Then, the relay SMRP is turned on at time t9. If the voltage VH is raised at this time, it is determined that the relay SMRB has been seized (seized on). After that, the relay SMRP is turned off at time t10.

FIG. 9 is a timing chart illustrating operation of the relays at the time when the first abnormality flag turned is on. That is, FIG. 9 illustrates operation of the relays at the time when foreign matter has possibly entered the relay SMRB.

With reference to FIG. 9, when an on operation is performed on the start switch 80 at time t11, the relay SMRB is turned on at time t12, and the relay SMRP is turned on at time t13. The operation described so far is the same as the operation at normal times illustrated in FIG. 8.

In spite of the fact that the relay SMRP is turned on at time t13, the voltage VH is less than the threshold value Vth (not illustrated) even when a predetermined time elapses, and therefore the first abnormality flag is turned on at time t14. Consequently, the foreign matter removal process for removing foreign matter that has possibly entered the relay SMRB is executed.

That is, the relays SMRB and SMRP which have been on are temporarily turned off at time t15. Then, after the relay SMRG is turned on at time t16, an on command is output to the relay SMRB at time t17. Since the smoothing capacitor 55 is not precharged at this time, the voltage difference between the power accumulation device 10 and the smoothing capacitor 55 is large, and an arc is generated on the surface of a contact point when the relay SMRB is turned on. In this example, the relay SMRB is turned on with foreign matter adhering to the surface of the contact point of the relay SMRB removed by the arc generated on the surface of the contact point.

FIG. 10 is a timing chart illustrating operation of the relays at the time when the second abnormality flag turned is on. That is, FIG. 10 illustrates operation of the relays at the time when foreign matter has possibly entered the relay SMRG.

With reference to FIG. 10, when an on operation is performed on the start switch 80 at time t21, the relay SMRB is turned on at time t22, and the relay SMRP is turned on at time t23. A precharge process is executed when the relay SMRP is turned on.

At time t24 at which a predetermined time Δtp1 has elapsed since time t23, the voltage VH is equal to or more than the threshold value Vth (not illustrated), and thus the relay SMRG is turned on. After that, the relay SMRP of the precharge circuit is turned off at time t25. The operation described so far is the same as the operation at normal times illustrated in FIG. 8.

In this example, the voltage VH becomes lower than the threshold value Vth (not illustrated) after the relay SMRP is turned off at time t25, and therefore the second abnormality flag is turned on at time t26. Consequently, the foreign matter removal process for removing foreign matter that has possibly entered the relay SMRG is executed.

That is, the relays SMRB and SMRG which have been on are temporarily turned off at time t27. Then, after the relay SMRB is turned on at time t28, an on command is output to the relay SMRG at time t29. The voltage VH has become lower than the threshold value Vth as the relay SMRP is turned off at time t25. Since the smoothing capacitor 55 is not precharged again at time t29, the voltage difference between the power accumulation device 10 and the smoothing capacitor 55 is large, and an arc is generated on the surface of a contact point when the relay SMRG is turned on. In this example, the relay SMRG is turned on with foreign matter adhering to the surface of the contact point of the relay SMRG removed by the arc generated on the surface of the contact point.

In the first embodiment, as described above, the foreign matter removal process is executed if the SMR 50 is not brought into the conductive state. In the foreign matter removal process, a relay that is not the one of the relays SMRB and SMRG that cannot be brought into the conductive state is brought into the conductive state, and thereafter an on command is output to the relay that cannot be brought into the conductive state without executing the precharge process. Consequently, an on command is output to the relay that cannot be brought into the conductive state when the voltage difference between the power accumulation device 10 and the smoothing capacitor 55 is large, which may make it possible to remove foreign matter using the energy of an arc generated at the contact point of the relay.

Second Embodiment

In the first embodiment described above, foreign matter that has possibly entered the relay SMRB or the relay SMRG is removed by an arc generated when the relay is turned on, by turning on the relay SMRB or SMRG when the precharge process is not executed. In a second embodiment, if the possibility of entry of foreign matter into the relay SMRG with which the precharge circuit is connected in parallel is detected, a precharge process is executed for a shorter time (adjustable) than that at normal times (when the relays are normal). This makes it possible to adjust the magnitude of the voltage difference between the power accumulation device 10 and the smoothing capacitor 55 at the time when the foreign matter removal process is executed, and to remove foreign matter while giving consideration to damage that may be received by the relay SMRG in the foreign matter removal process.

The power accumulation system according to the second embodiment is different from the power accumulation system described in relation to the first embodiment in the content of the relay foreign matter removal process.

Figure 11:
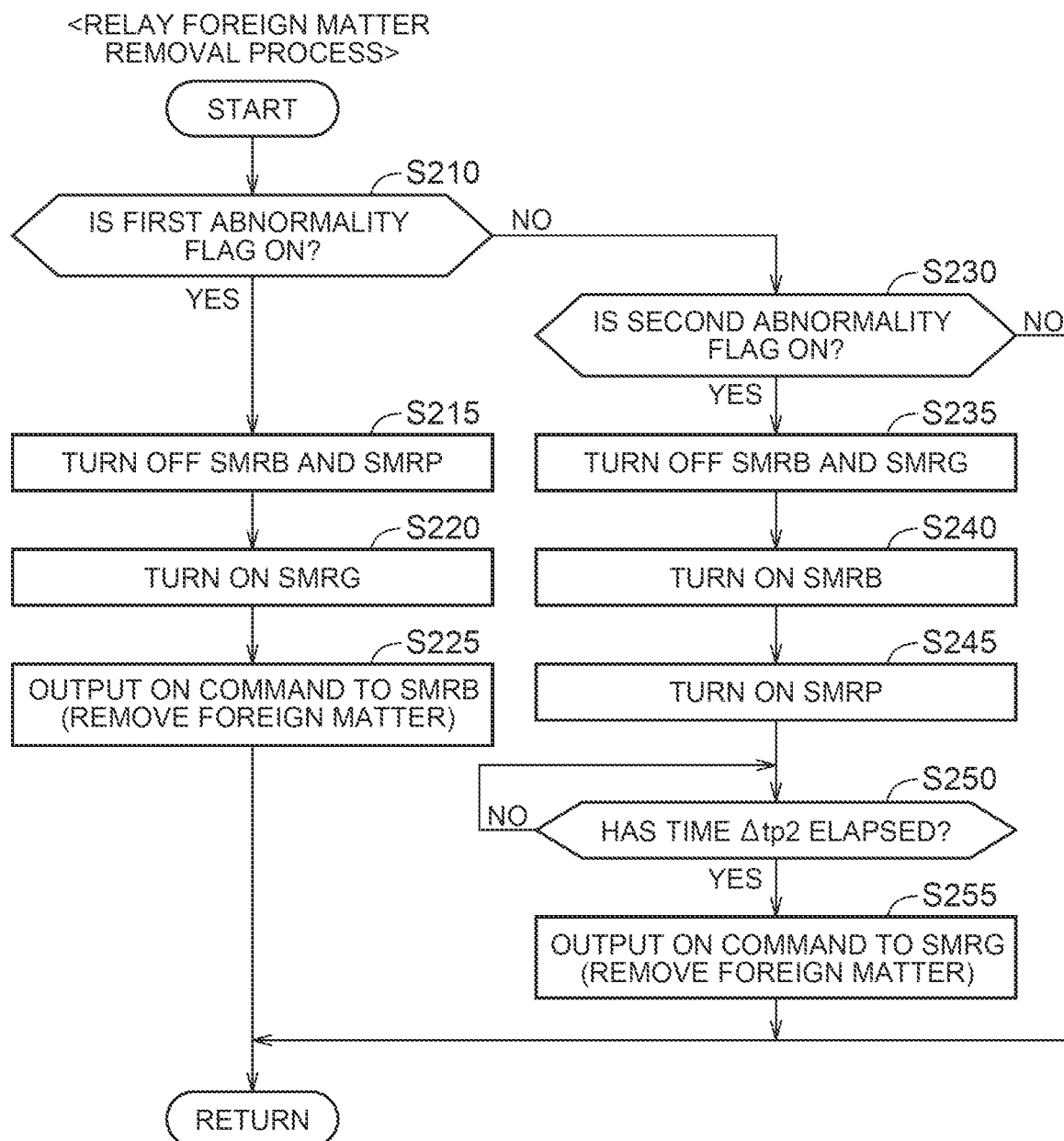
FIG. 11 is a flowchart illustrating an example of the procedure of a relay foreign matter removal process according to a second embodiment.

FIG. 11 is a flowchart illustrating an example of the procedure of the relay foreign matter removal process according to the second embodiment. This flowchart corresponds to the flowchart described in relation to FIG. 7 in the first embodiment described above.

With reference to FIG. 11, the processes in steps S210 to S240 are the same as the processes in steps S110 to S140, respectively, indicated in FIG. 7. If it is determined in step S230 that the second abnormality flag is on and the relay SMRB is turned on in step S240, the ECU 70 turns on the relay SMRP (step S245).

Next, the ECU 70 determines whether a time Δtp2 has elapsed since the relay SMRP is turned on (step S250). The time Δtp2 is shorter than the precharge time in the normal precharge process (predetermined time in step S25 in FIG. 6), and is determined, as appropriate, in consideration of the voltage difference between the power accumulation device 10 and the smoothing capacitor 55 required to remove foreign matter and damage to the relay SMRG from which foreign matter is to be removed.

When the time Δtp2 elapses (YES in step S250) since the relay SMRP is turned on in step S250, the ECU 70 outputs an on command to the relay SMRG for which the possibility of entry of foreign matter is detected (step S255). Consequently, if foreign matter adheres to the surface of a contact point of the relay SMRG, it may be possible to remove the foreign matter using the energy of an arc generated at the contact point of the relay SMRG while considering damage to the relay SMRG which is turned on when the voltage difference between the power accumulation device 10 and the smoothing capacitor 55 is large.

Figure 12:
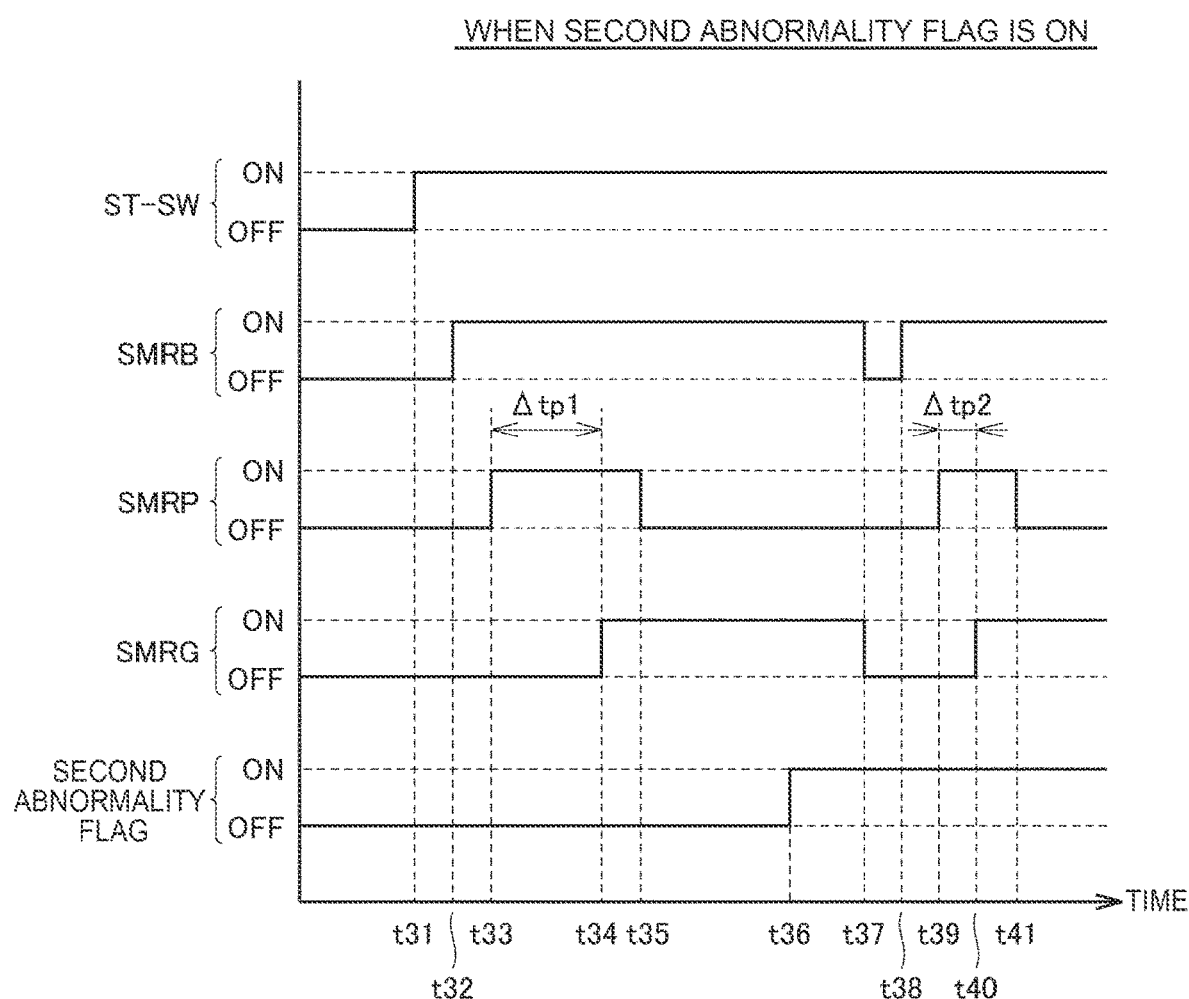
FIG. 12 is a timing chart illustrating operation of relays at the time when a second abnormality flag is turned on in the second embodiment.

FIG. 12 is a timing chart illustrating operation of the relays at the time when the second abnormality flag is turned on in the second embodiment. FIG. 12 corresponds to FIG. 10 described in relation to the first embodiment.

With reference to FIG. 12, operation of the relays at times t31 to t38 is the same as operation of the relays at times t21 to t28 illustrated in FIG. 10.

When the relay SMRB is turned on again at time t38, the relay SMRP is turned on at time t39. Consequently, the precharge process is started. Then, an on command is output to the relay SMRG at time t40 at which a predetermined time Δtp2 (Δtp2<Δtp1) has elapsed since time t39. Consequently, in this example, the relay SMRG is turned on with foreign matter adhering to the surface of the contact point of the relay SMRG removed by the arc generated on the surface of the contact point when the relay SMRG is turned on. After that, the relay SMRP is turned off at time t41.

With the second embodiment, as described above, the magnitude of the voltage difference between the power accumulation device 10 and the smoothing capacitor 55 at the time when an on command is output to the relay SMRG in the foreign matter removal process can be adjusted by adjusting the predetermined time Δtp2 (Δtp2<Δtp1) if the possibility of entry of foreign matter into the relay SMRG is detected. Thus, foreign matter can be removed while giving consideration to damage that may be received by the relay SMRG in the foreign matter removal process.

[Modification]

In the second embodiment described above, the time (predetermined time Δtp2) since the relay SMRP is turned on until the relay SMRG is turned on is monitored in order to execute a precharge process for a shorter time than that at normal times if the second abnormality flag is on (when an abnormality of the relay SMRG is detected). However, the voltage difference between the power accumulation device 10 and the smoothing capacitor 55 may be monitored in place of the time. That is, the precharge process is finished and the relay SMRG is turned on when the voltage difference described above is large compared to the precharge process at normal times (at the time when the relays are normal). This makes it possible to directly adjust the magnitude of the voltage difference between the power accumulation device 10 and the smoothing capacitor 55 at the time when the foreign matter removal process is executed, and to remove foreign matter while giving consideration to damage that may be received by the relay SMRG in the foreign matter removal process.

Figure 13:
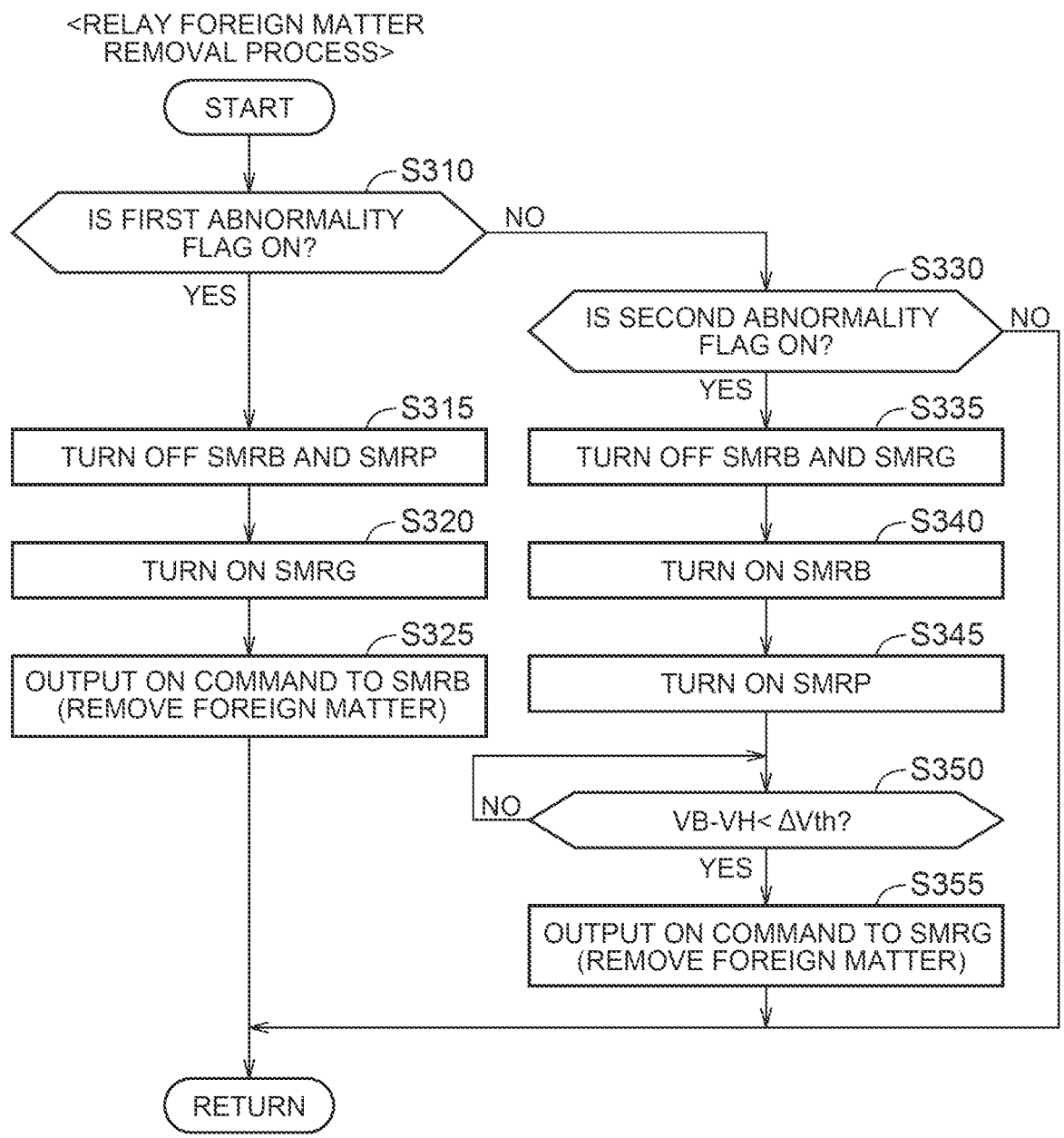
FIG. 13 is a flowchart illustrating an example of the procedure of a relay foreign matter removal process according to a modification.

FIG. 13 is a flowchart illustrating an example of a procedure of a relay foreign matter removal process according to a modification. This flowchart corresponds to the flowchart in FIG. 11 for the second embodiment described above.

With reference to FIG. 13, the processes in steps S310 to S345 and S355, excluding step S350, are the same as the processes in steps S210 to S245 and S255, respectively, illustrated in FIG. 11. When the relay SMRP is turned on in step S345, the ECU 70 determines whether the voltage difference between a voltage VB, which indicates the voltage of the power accumulation device 10, and the voltage VH is less than a threshold value ΔVth (step S350). The threshold value ΔVth is larger than the voltage difference at the time when the normal precharge process is finished, and is determined, as appropriate, in consideration of the voltage difference between the power accumulation device 10 and the smoothing capacitor 55 required to remove foreign matter and damage to the relay SMRG from which foreign matter is to be removed. The voltage VB is detected by a voltage sensor (not illustrated) that detects the voltage of the power accumulation device 10.

When the voltage difference between the voltage VB of the power accumulation device 10 and the voltage VH is less than the threshold value ΔVth in step S350 (YES in step S350), the process transitions to step S355, and the ECU 70 outputs an on command to the relay SMRG for which the possibility of entry of foreign matter is detected.

Also with the modification, as described above, foreign matter can be removed while giving consideration to damage that may be received by the relay SMRG in the foreign matter removal process.

In the embodiments described above, the precharge circuit which includes the relay SMRP and the limiting resistor 52 is provided in parallel with the relay SMRG. However, the precharge circuit may be provided in parallel with the relay SMRB. In this case, the various processes and operation of the relays can be described by replacing the relay SMRB and the relay SMRG in the description of the embodiments made above.

The embodiments disclosed herein should be considered as exemplary in all respects and not limiting. The scope of the present disclosure is defined by the claims, rather than the description of the embodiments made above, and intended to include all changes that fall within the meaning and scope of the claims and equivalents thereof.

What is claimed is:

1. A power accumulation system comprising:
a power accumulation device;
a relay device provided in a pair of power lines disposed between the power accumulation device and a power conversion device that exchanges power with the power accumulation device;
a capacitor provided between the pair of power lines between the relay device and the power conversion device; and
an electronic control device that controls the relay device, wherein:
the relay device includes a first relay provided in one of the pair of power lines, a second relay provided in the other of the pair of power lines, and a precharge circuit connected in parallel with the second relay;
the precharge circuit includes a third relay and a limiting resistor connected in series with the third relay;
each of the first relay and the second relay is a contact relay;
the electronic control device is configured to execute a predetermined foreign matter removal process when it is not possible to bring one of the first relay and the second relay from a power blocking state to a conductive state; and
the foreign matter removal process includes a process of bringing a relay that is not the one of the relays that is not possible to be brought into the conductive state into the conductive state in a state in which the first to third relays are in the power blocking state, and then outputting a conduction command to the relay that is not possible to be brought into the conductive state.

2. The power accumulation system according to claim 1, wherein:
the electronic control device is configured to execute a precharge process when the power accumulation system is started, the precharge process including a process of bringing the third relay into the conductive state after the first relay is brought into the conductive state and before the second relay is brought into the conductive state; and
the electronic control device is configured to execute the foreign matter removal process without executing the precharge process when it is not possible to bring one of the first relay and the second relay from the power blocking state to the conductive state.

3. The power accumulation system according to claim 1, wherein:

the electronic control device is configured to execute a precharge process when the power accumulation system is started, the precharge process including a process of bringing the third relay into the conductive state after the first relay is brought into the conductive state and before the second relay is brought into the conductive state; and the electronic control device is configured to output a conduction command to the second relay after a predetermined time elapses since the third relay is brought into the conductive state after the first relay is brought into the conductive state in the foreign matter removal process when it is not possible to bring the second relay from the power blocking state to the conductive state; and the predetermined time is shorter than a precharge time since the third relay is brought into the conductive state until the second relay is brought into the conductive state in the precharge process.

4. The power accumulation system according to claim 1, wherein:

the electronic control device is configured to execute a precharge process when the power accumulation system is started, the precharge process including a process of bringing the third relay into the conductive state after the first relay is brought into the conductive state and before the second relay is brought into the conductive state;

the electronic control device is configured to output a conduction command to the second relay after the third relay is brought into the conductive state after the first relay is brought into the conductive state in the foreign matter removal process when it is not possible to bring the second relay from the power blocking state to the conductive state; and a voltage difference between a voltage of the power accumulation device and a voltage of the capacitor at a time when the conduction command is output to the second relay in the foreign matter removal process is larger than the voltage difference at a time when the second relay is brought into the conductive state in the precharge process.

5. A vehicle comprising:

the power accumulation system according to claim 1;

a power conversion device that exchanges power with the power accumulation system; and an electric motor for travel that receives power from the power conversion device to generate a drive force.

* * * * *